United States Patent [19]

Sato

[11] Patent Number: 5,768,157
[45] Date of Patent: Jun. 16, 1998

[54] METHOD OF DETERMINING AN INDICATION FOR ESTIMATING ITEM PROCESSING TIMES TO MODEL A PRODUCTION APPARATUS

[75] Inventor: Akira Sato, Yamagata, Japan

[73] Assignee: NEC Corporation, Tokyo, Japan

[21] Appl. No.: 561,638

[22] Filed: Nov. 22, 1995

[30] Foreign Application Priority Data

Nov. 22, 1994 [JP] Japan .................. 6-287736

[51] Int. Cl.$^6$ .................................. G06F 9/455
[52] U.S. Cl. .................................. 364/578
[58] Field of Search .................. 364/578, 721, 364/554, 149

[56] References Cited

U.S. PATENT DOCUMENTS

| 3,789,203 | 1/1974 | Catherall et al. | 235/152 |
| 4,320,463 | 3/1982 | Himmelstein | 364/552 |
| 4,809,196 | 2/1989 | Miller | 364/550.01 |
| 5,388,058 | 2/1995 | Yamada | 364/554 |
| 5,446,681 | 8/1995 | Gethner et al. | 364/554 |

FOREIGN PATENT DOCUMENTS

0 624 847 A1  11/1994  European Pat. Off. .

Primary Examiner—Kevin J. Teska
Assistant Examiner—Dan Fiul
Attorney, Agent, or Firm—Foley & Lardner

[57] ABSTRACT

A method is disclosed for determining a regression equation for modeling a production apparatus which processes a plurality of items in lots of different sizes. The regression equation is used to estimate a lot processing time of each of the lots. First, data representing the lot processing times is collected from the apparatus and inputted to a computer. Then, a frequency distribution for the lot processing times is determined in connection with each of the lots. Next, a plurality of sets of lot processing times are extracted from each of the frequency distributions by varying the data extraction rate. An average processing time of each of the plurality of sets of lot processing times is calculated. Then, a plurality of regression lines for the average lot processing times are determined for each of the lots. A degree of departure of each of the average lot processing times is determined based on the regression lines. Finally, the regression equation is selected from the regression lines based on the degree of departure.

11 Claims, 15 Drawing Sheets

FIG. 1 (PRIOR ART)

SEQUENCE OF APPARATUSES
FOR IC FABRICATION

DATA : LOT PROCESSING TIMES (MINUTES) MEASURED AT "APPARATUS An" WITH RESPECT TO LOT SIZES 1-5

| DATA NO. \ LOT SIZE | 1 | 2 | 3 | 4 | 5 |
|---|---|---|---|---|---|
| 1 | 2 | 3 | 5 | 2 | 9 |
| 2 | 3 | 4 | 7 | 4 | 9 |
| 3 | 4 | 3 | 5 | 5 | 9 |
| 4 | 3 | 3 | 7 | 7 | 9 |
| 5 | 5 | 4 | 7 | 7 | 7 |
| 6 | 4 | 7 | 2 | 5 | 8 |
| 7 | 1 | 3 | 3 | 5 | 8 |
| 8 | 4 | 3 | 4 | 8 | 4 |
| 9 |  | 4 | 4 | 8 | 5 |
| 10 |  | 4 | 5 | 6 | 5 |
| 11 |  | 7 | 6 | 7 | 6 |
| 12 |  | 4 | 6 | 7 | 6 |
| 13 |  | 4 | 6 | 7 | 9 |
| 14 |  | 3 | 6 | 6 | 9 |
| 15 |  | 3 | 7 | 6 | 9 |
| 16 |  | 3 | 7 | 8 | 11 |
| 17 |  | 4 | 6 | 8 | 11 |
| 18 |  | 1 | 6 | 7 | 11 |
| 19 |  | 4 | 6 | 7 | 12 |
| 20 |  | 4 | 5 | 8 | 10 |
| 21 |  |  | 5 | 8 | 11 |
| 22 |  |  |  | 10 | 12 |
| 23 |  |  |  | 11 | 15 |
| 24 |  |  |  | 5 | 10 |
| 25 |  |  |  | 6 | 10 |
| 26 |  |  |  | 6 | 10 |
| 27 |  |  |  | 8 | 14 |
| 28 |  |  |  | 9 | 11 |
| 29 |  |  |  | 9 | 1 |
| 30 |  |  |  | 9 | 10 |
| 31 |  |  |  | 9 | 13 |
| 32 |  |  |  | 10 | 12 |
| 33 |  |  |  |  | 12 |
| 34 |  |  |  |  | 12 |
| 35 |  |  |  |  | 10 |
| 36 |  |  |  |  | 10 |
| 37 |  |  |  |  | 11 |
| 38 |  |  |  |  | 12 |
| 39 |  |  |  |  | 8 |
| 40 |  |  |  |  | 8 |
| 41 |  |  |  |  | 9 |
| 42 |  |  |  |  | 12 |
| 43 |  |  |  |  | 10 |
| 44 |  |  |  |  | 7 |
| 45 |  |  |  |  | 12 |
| 46 |  |  |  |  | 9 |
| 47 |  |  |  |  | 11 |

| LOT PROCESSING TIME (MINUTE) | FREQUENCY (NUMBER OF PIECES OF DATA) | | | | |
|---|---|---|---|---|---|
| | LOT SIZE 1 | LOT SIZE 2 | LOT SIZE 3 | LOT SIZE 4 | LOT SIZE 5 |
| 1 | 1 | 1 | | | 1 |
| 2 | 1 | | 1 | 1 | |
| 3 | 2 | 8 | 1 | | |
| 4 | 3 | 9 | 2 | 1 | 1 |
| 5 | 1 | | 5 | 4 | 2 |
| 6 | | | 7 | 5 | 2 |
| 7 | | 2 | 5 | 7 | 2 |
| 8 | | | | 7 | 4 |
| 9 | | | | 4 | 9 |
| 10 | | | | 2 | 8 |
| 11 | | | | 1 | 7 |
| 12 | | | | | 8 |
| 13 | | | | | 1 |
| 14 | | | | | 1 |
| 15 | | | | | 1 |

FIG. 7

| LOT PROCESSING TIME (MINUTE) | FREQUENCY (NUMBER OF PIECES OF DATA) | | | | |
|---|---|---|---|---|---|
| | LOT SIZE 1 | LOT SIZE 2 | LOT SIZE 3 | LOT SIZE 4 | LOT SIZE 5 |
| 1 | 1 (5) | | | | 1 (13) |
| 2 | 1 (4) | | | | |
| 3 | 2 (2) | 1 (4) | | | |
| 4 | 3 (1) | 8 (2) | | | |
| 5 | 1 (3) | 9 (1) | | | |
| 6 | | | 1 (6) | 1 (9) | 1 (12) |
| 7 | | | 1 (5) | 1 (8) | 2 (8) |
| 8 | | 2 (3) | 2 (4) | 4 (5) | 2 (7) |
| 9 | | | 5 (3) | 5 (3) | 2 (6) |
| 10 | | | 7 (1) | 7 (2) | 4 (5) |
| 11 | | | 5 (2) | 7 (1) | 9 (1) |
| 12 | | | | 4 (4) | 8 (2) |
| 13 | | | | 2 (6) | 7 (3) |
| 14 | | | | 1 (7) | 8 (4) |
| 15 | | | | | 1 (9) |

FIG. 14

CALCULATED AVERAGE LOT PROCESSING TIME (MINUTE)

| DATA EXTRACTION RATE | LOT SIZE | | | | |
|---|---|---|---|---|---|
| | 1 | 2 | 3 | 4 | 5 |
| 100 % | 3.25 | 3.75 | 5.48 | 7.13 | 9.55 |
| 80 % | 3.57 | 3.53 | 6.00 | 7.07 | 10.00 |
| 60 % | 3.60 | 3.53 | 6.00 | 7.43 | 10.44 |
| 40 % | 3.60 | 4.00 | 6.42 | 7.50 | 9.92 |
| 20 % | 4.00 | 4.00 | 6.00 | 8.00 | 9.47 |

FIG. 16

LOT PROCESSING TIME ON REGRESSION LINE

| DATA EXTRACTION RATE | LOT SIZE | | | | |
|---|---|---|---|---|---|
| | 1 | 2 | 3 | 4 | 5 |
| 100 % | 2.64 | 4.24 | 5.84 | 7.44 | 9.04 |
| 80 % | 2.75 | 4.39 | 6.03 | 7.67 | 9.31 |
| 60 % | 2.69 | 4.45 | 6.21 | 7.97 | 9.73 |
| 40 % | 3.06 | 4.67 | 6.28 | 7.89 | 9.50 |
| 20 % | 3.30 | 4.79 | 6.28 | 7.77 | 9.26 |

LOT PROCESSING TIME (MINUTE)

FIG. 15(a)

REGRESSION EQUATION $y = 1.60x + 1.04$

DATA EXTRACTION RATE = 100 %

DATA EXTRACTION RATE = 80 %

DATA EXTRACTION RATE = 60 %

DATA EXTRACTION RATE = 40 %

DATA EXTRACTION RATE = 20 %

LOT SIZE →

FIG. 17

| DATA EXTRACTION RATE | LOT SIZE | | | | | MAX | MIN | \|MAX\|+\|MIN\| |
|---|---|---|---|---|---|---|---|---|
| | 1 | 2 | 3 | 4 | 5 | | | |
| 100% | 0.23 | -0.12 | -0.06 | -0.04 | 0.06 | 0.23 | -0.12 | 0.35 |
| 80% | 0.30 | -0.20 | 0.00 | -0.08 | 0.07 | 0.30 | -0.20 | 0.50 |
| 60% | 0.34 | -0.21 | -0.03 | -0.07 | 0.07 | 0.34 | -0.21 | 0.55 |
| 40% | 0.18 | -0.14 | 0.02 | -0.05 | 0.04 | 0.18 | -0.14 | 0.32 |
| 20% | 0.21 | -0.16 | -0.04 | 0.03 | 0.02 | 0.21 | -0.16 | 0.37 |

DEPARTURE RATE OF CALCULATED AVERAGE LOT PROCESSING TIME FROM VALUE ON REGRESSION LINE

METHOD OF DETERMINING AN INDICATION FOR ESTIMATING ITEM PROCESSING TIMES TO MODEL A PRODUCTION APPARATUS

BACKGROUND OF THE INVENTION

1. Field of the Invention

The present invention relates to a method of determining a regression equation which is well suited for modeling a production apparatus which is arranged to process a plurality of items in lots of different sizes. The present invention is discussed with reference to an IC (integrated circuit) fabrication apparatus but is in no way limited to such an application.

2. Description of the Related Art

As is known, an IC consists of many microscopic regions on a wafer surface that make up the transistors, diodes, etc. In a planar process, the regions are fabricated by a sequence of steps, each step adding another layer to selected areas of the wafer surface. The form of each layer is determined by a geometric pattern representing circuit design information that is transferred to the wafer surface by a procedure known as lithography.

Figure 1:
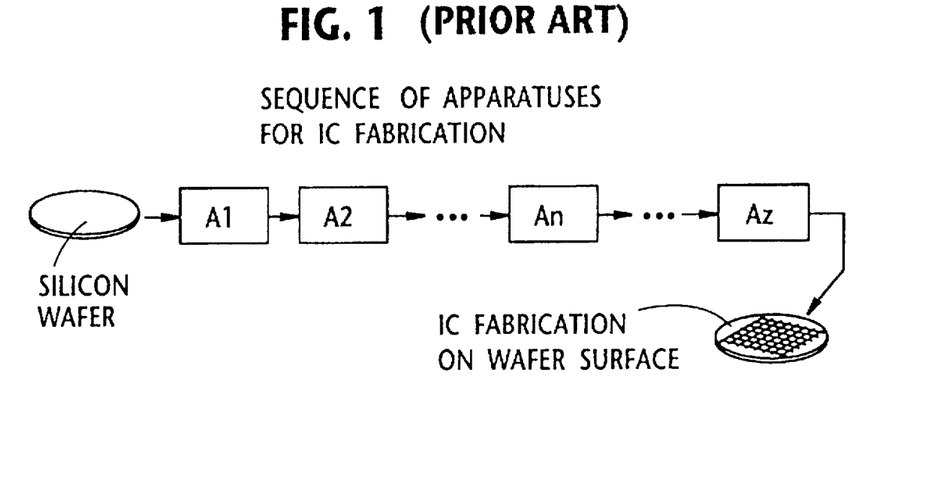
FIG. 1 is a sketch schematically showing a sequence of apparatuses for IC fabrication, having been referred to in the opening paragraphs.
Figures 2A, 2E:
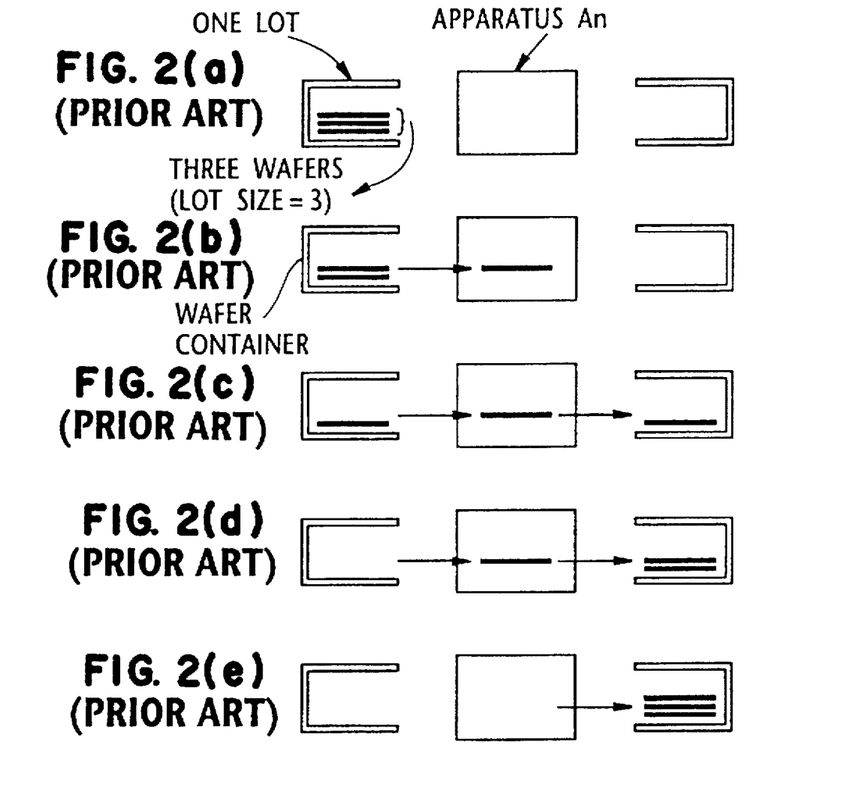

FIG. 1 is a sketch schematically showing a sequence of apparatuses (denoted by A1, A2, . . . , An, . . . , Az) for IC fabrication on silicon wafers. FIGS. 2(a–e) are sketches schematically illustrating a manner which sequentially processes three wafers (one lot) by the apparatus An (for example) of FIG. 1.

Each apparatus of the IC fabrication sequence is usually supplied with a variety of lots in the case of fabrication of ASIC (application specific IC) in order to comply with various orders from customers. The lot sizes may range from one to several tens (for example).

An IC fabrication apparatus is constructed from various parts which exhibit time-dependent factors such as wear or aged deterioration. Further, the IC fabrication is affected by external disturbances such as outside temperature change, humidity, etc. Accordingly, a processing time of each of various lots is liable to change over time. However, change of the lot processing times has hitherto been empirically estimated and thus, it is very difficult to exactly (quantitatively) estimate the processing times of different lot sizes for modeling each IC fabrication apparatus.

What is desired is to correctly estimate processing times of different lots processed in the same fabrication apparatus irrespective of both the internal and external disturbances.

SUMMARY OF THE INVENTION

It is an object of the present invention to provide a method of determining an indication which is able to precisely estimate processing times of different lots to be processed in a given fabrication apparatus.

An aspect of the present invention resides in a method of determining a regression equation for modeling a production apparatus which is arranged to process a plurality of items in lots of different sizes, the regression equation estimating a lot processing time of each of the lots. The method includes the steps of: (a) inputting data to a computer, the data representing a plurality of lot processing times of each of the lots, the data having been collected from the apparatus before being inputted to said computer; (b) determining, using the data, a frequency distribution for the lot processing times in connection with each of said lots; (c) extracting a plurality of sets of lot processing times from each of the frequency distributions by varying a data extracting rate; (d) calculating an average processing time of each of the plurality of sets of lot processing times; (e) determining a plurality of regression lines for the average lot processing times in connection with the respective lots; (f) determining a degree of departure of each of the average lot processing times from a corresponding value on each of the regression lines; (g) selecting one of the regression lines using the degree of departure, the one of the regression line being determined as indicating said regression equation.

BRIEF DESCRIPTION OF THE DRAWINGS

The features and advantages of the present invention will become more clearly appreciated from the following description taken in conjunction with the accompanying drawings in which like elements are denoted by like reference numerals and in which:

FIGS. 2(a–e) are sketches schematically showing a manner which sequentially processes three wafers by one of the apparatus shown in FIG. 1;

FIGS. 6(a–e) are illustrations showing a plurality of frequency histograms which respectively correspond to the frequency distributions of FIG. 5;

FIGS. 8(a–e) are illustrations showing a plurality of frequency histograms which respectively correspond to the histograms of FIG. 5 and which additionally indicate order of employing part of lot processing time data;

FIGS. 9(a–e) to 13(a–e) are diagrams each graphically showing data extraction rates discussed in a preferred embodiment;

FIGS. 15(a–e) are diagrams listing a plurality of regression lines (regression equations) for lot processing times;

DETAILED DESCRIPTION OF THE PREFERRED EMBODIMENT

A preferred embodiment of the present invention is discussed with reference to FIGS. 3–17.

Although the present invention is described when applied to a production apparatus of a IC fabrication sequence (see FIGS. 1 and 2(a–e)), it is in no way limited to such an application.

It is assumed, merely for the sake of simplifying the instant disclosure, that the number of lot sizes of wafers discussed below range from one to five. Data indicating lot processing times at a given manufacturing apparatus had been collected and is kept until being applied to a computer (not shown in the drawings). By way of example, it is assumed that the above mentioned data has been gathered from the apparatus An (FIGS. 1 and 2(a–e)). The data has been collected over an appropriate time period in order to get information suitable for assessing or modeling the apparatus An (for example).

Figure 3:
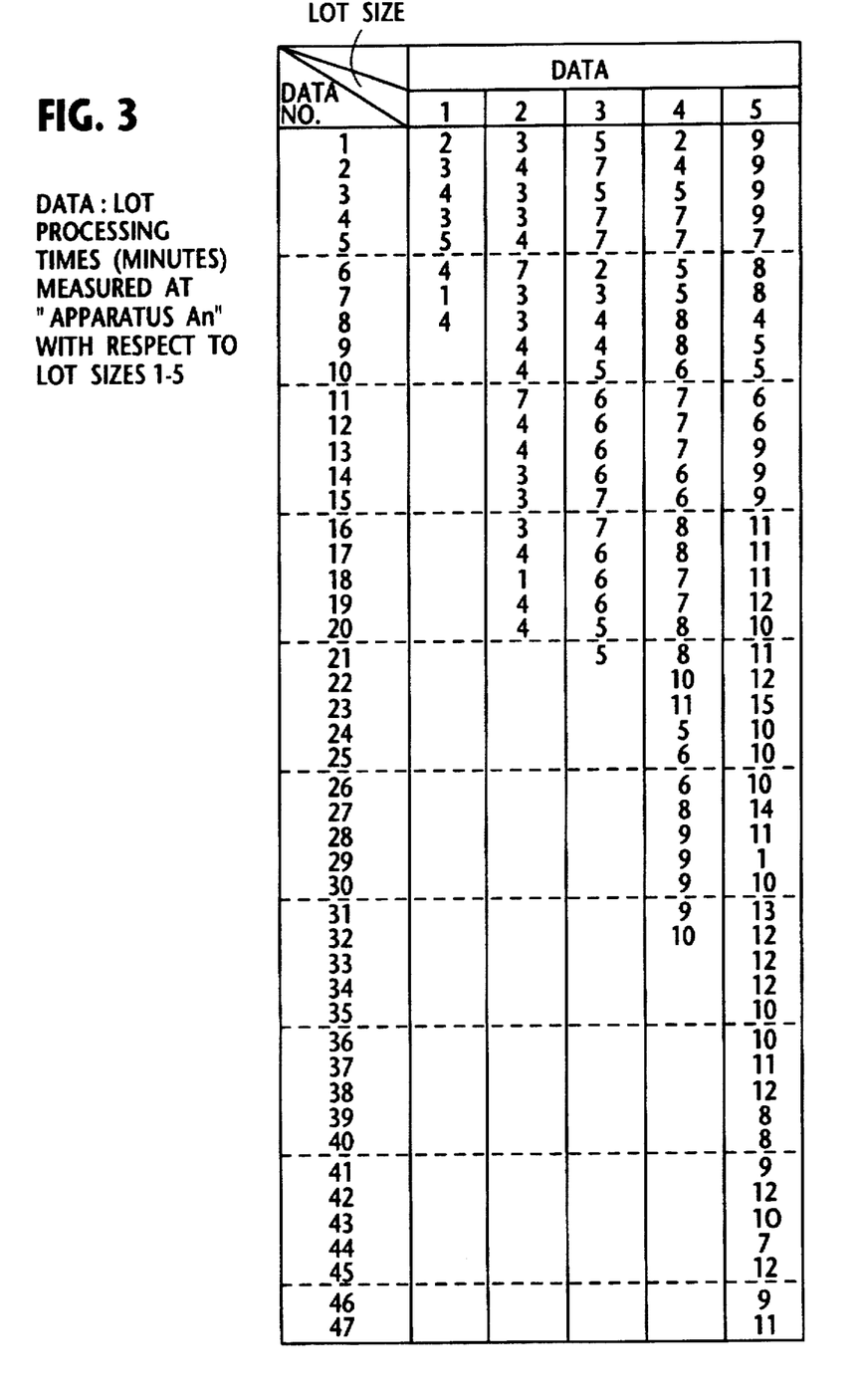
FIG. 3 is a table showing data (lot processing times) to be inputted to a computer.

Examples of data previously prepared (collected) are listed in FIG. 3. As shown, the total numbers of pieces of data (viz., lot processing times (minutes)) of the respective lot sizes 1–5 amount to 8, 20, 21, 32, and 47, respectively.

Figure 4:
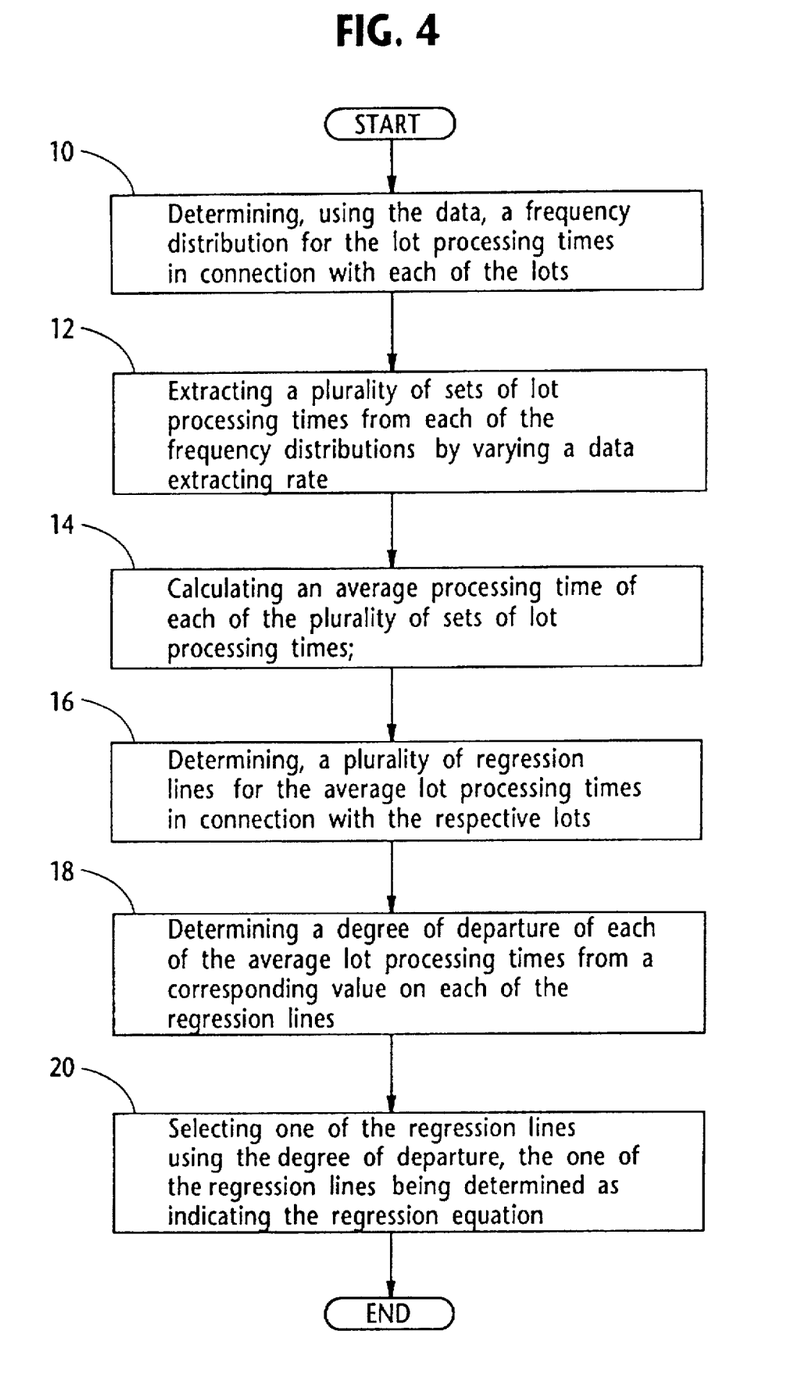
FIG. 4 is a flow chart which shows the steps which characterize the operation of the present invention.

FIG. 4 is a flow chart which shows the steps which characterize the operation of the present invention (viz., the operation after the data shown in FIG. 4 is inputted to the computer and stored in a suitable memory).

In FIG. 4, at step 10, five frequency distributions for the lot processing times are determined, using the data inputted to the computer, in connection with the respective lots (lot sizes). The determination of a frequency distribution itself is well known in the art. The above mentioned five frequency distributions are depicted in the form of list in FIG. 5 and further depicted in histogram form in FIGS. 6(a–e).

Figure 5:
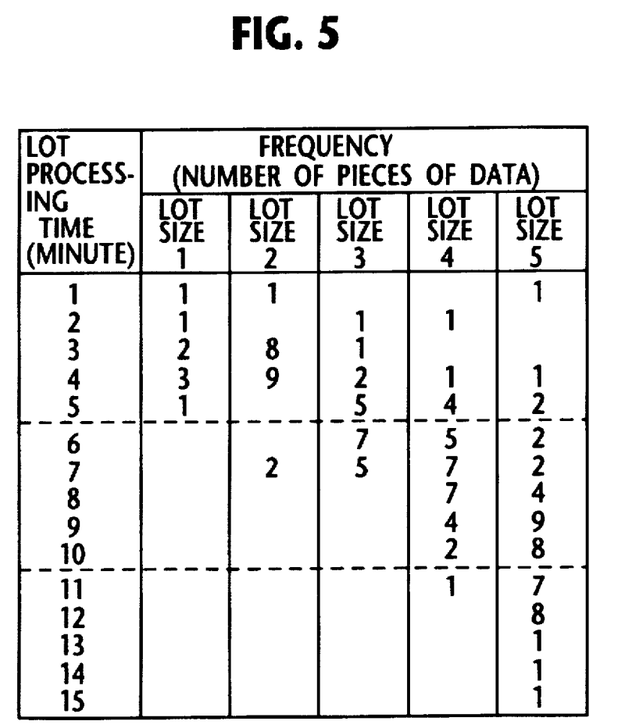
FIG. 5 is a table showing frequency distributions for lot processing times.
Figure 6A:
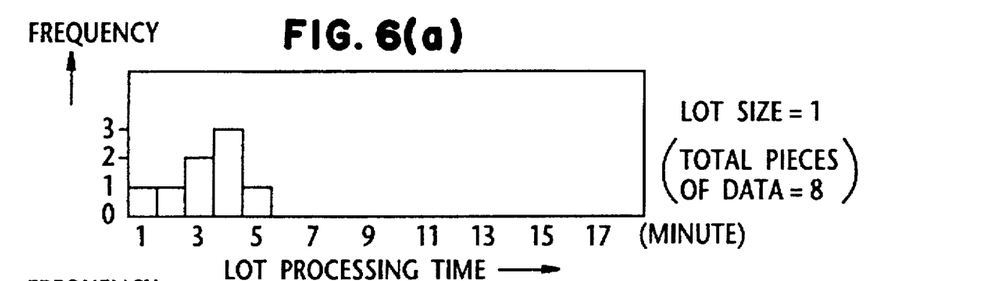
Figure 6B:
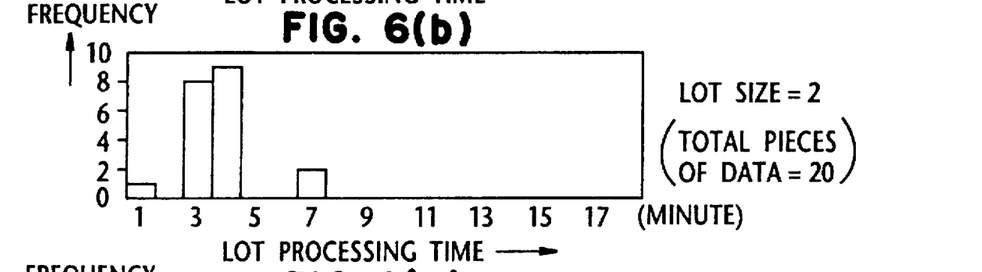
Figure 6C:
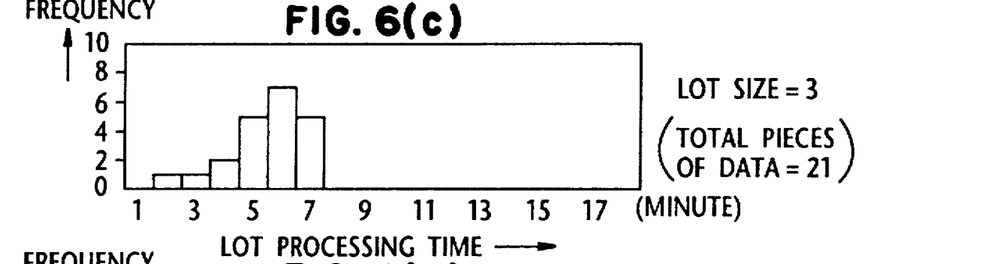
Figure 6D:
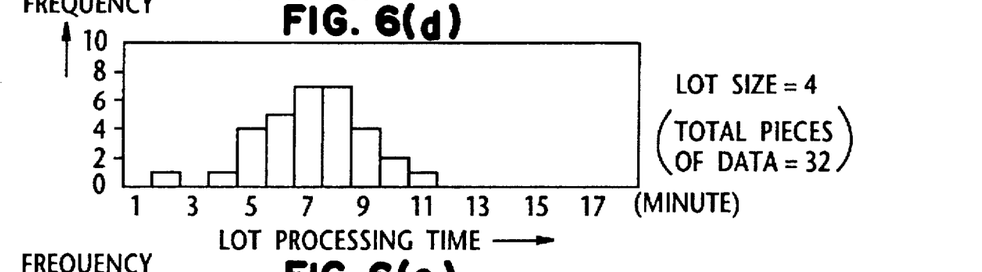
Figure 6E:
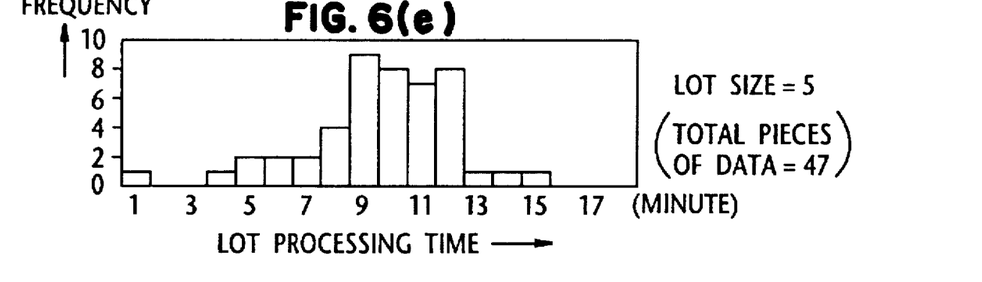

At step 12, a plurality of sets of lot processing times (pieces of data) are extracted from each of the frequency distributions (FIGS. 5 and 6(a–e)) by changing a data extraction rate. In the present embodiment, the data is extracted by changing the extraction rate from 100% down to 20% at the interval of 20%.

The operation at step 12 is described in detail with reference to FIGS. 7–13.

Firstly, the maximum frequency of each of the five frequency distributions is determined. It is clear from FIGS. 5 or 6(a–e) that the frequencies of 3, 9, 7, 7, and 9 are respectively the maximum values of the respective lot sizes 1–5. In addition to the above, the total number of pieces of data is determined with respect to each of the five frequency distributions (or directly from the raw data inputted to the computer, see FIG. 3. The total number of pieces of data are mentioned above and indicated at the right side of each of FIGS. 6(a–e).

Following this, an order of extracting the frequencies while varying a data extraction rate is determined. The maximum frequency is to initially be extracted for subsequent calculations. Thereafter, the two frequencies adjacent to the maximum frequency are compared and the larger one is selected as the second frequency to be added to the maximum frequency. If the above mentioned two frequencies equal with each other, the frequency of the larger lot processing time is selected. Further, if one side of the maximum frequency exhibits "zero data", the frequency nearest to the maximum frequency is assumed as the adjacent one. This applies to the case where both sides of the maximum frequency are vacant (zero data).

When the extracting order of the two frequencies has been determined, these two frequencies are treated as one group (in other words, treated as if one frequency). Accordingly, it is understood that the above mentioned principle is applicable to the determination of the extracting order of the remaining frequencies.

Figure 7:
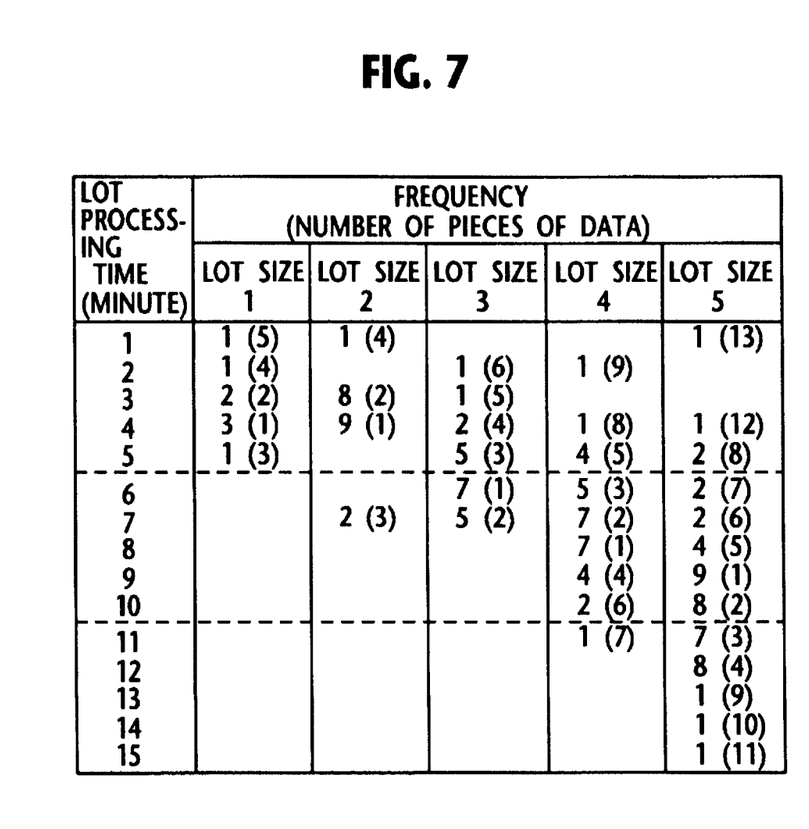
FIG. 7 is a table which corresponds to that of FIG. 5 and which additionally indicate order of employing part of lot processing time data.

In FIG. 7, the order of data extraction of each of the lot sizes 1–5 is shown in parentheses. Other than this, FIG. 7 is identical to FIG. 5.

The above mentioned rule of specifying the order of selecting the frequencies is exemplary and may be changed in order to more appropriately extract the data. For example, in the case where there are two identical frequencies from which one should be selected as a preceding one, the frequency at the lower lot processing time may be chosen.

In FIGS. 8(a–e), the order of data extraction of each of the lot sizes 1–5 is also shown. Other than this, FIG. 8 is identical to FIG. 6.

FIGS. 9(a–e) to 13(a–e) illustrate respectively data extraction rates 100%, 80%, 60%, 40%, and 20%. As shown in FIGS. 9(a–e) to 13(a–e), the frequencies of the hatched bars are extracted or used for calculating average lot processing times at step 14.

Figure 9A:
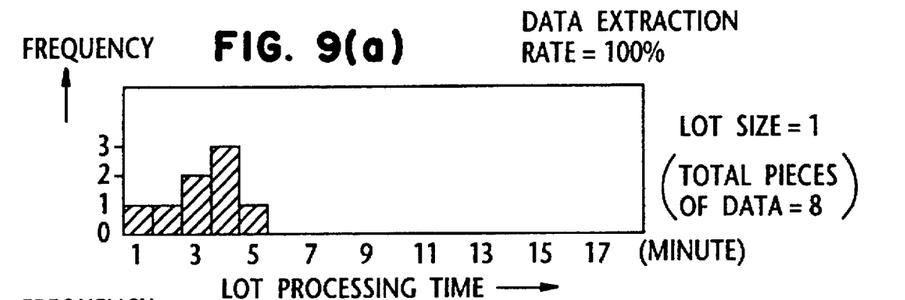
Figure 9B:
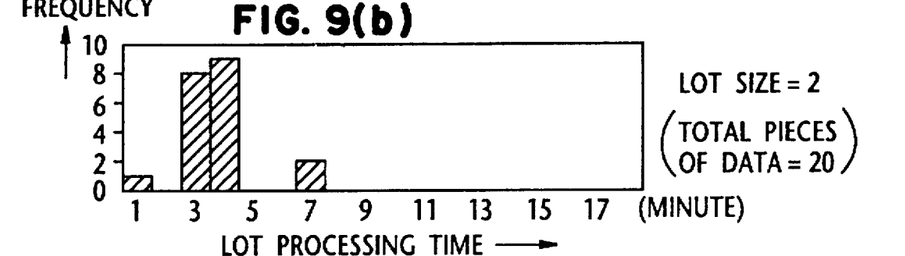
Figure 9C:
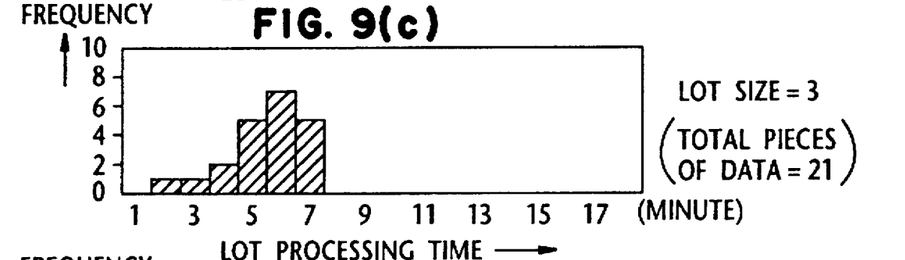
Figure 9D:
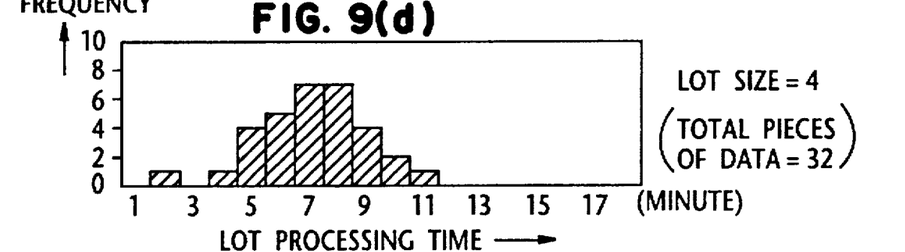
Figure 9E:
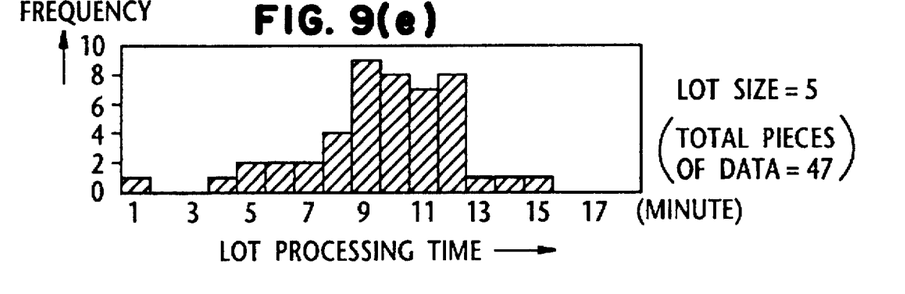
Figure 10A:
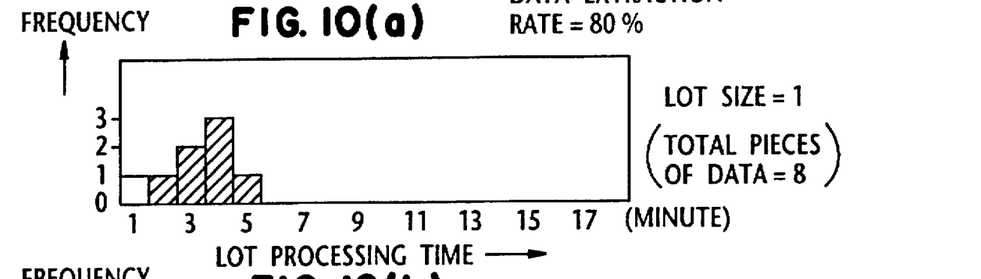
Figure 10B:
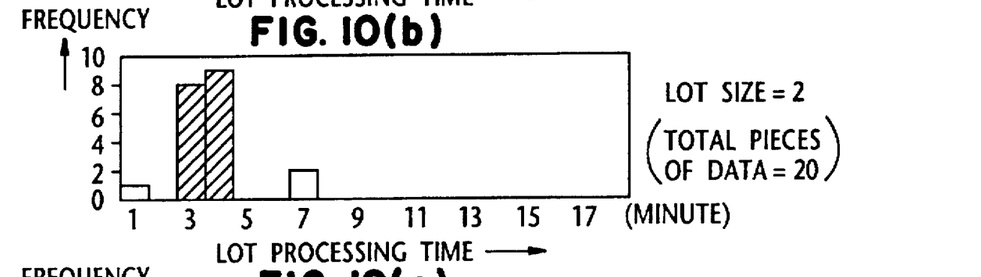
Figure 10C:
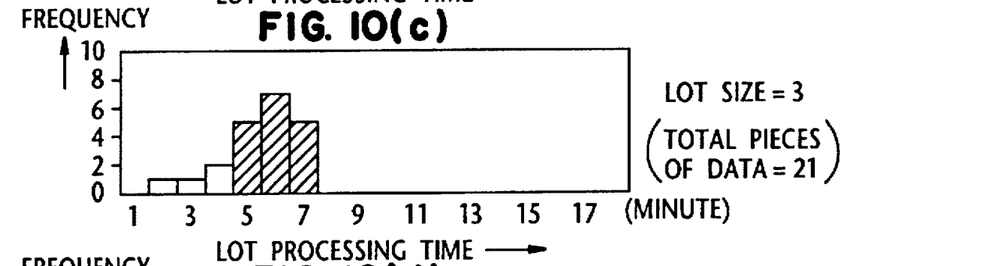
Figure 10D:
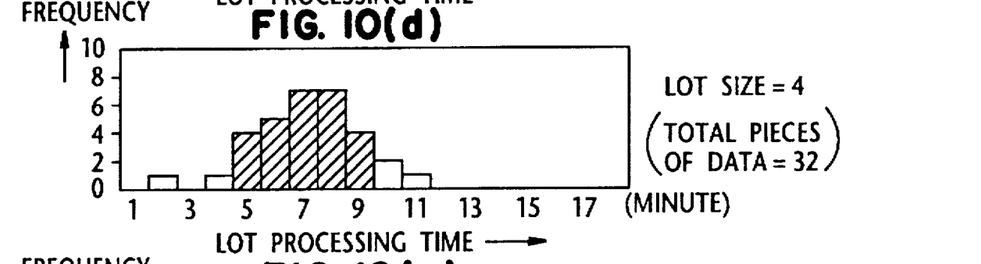
Figure 10E:
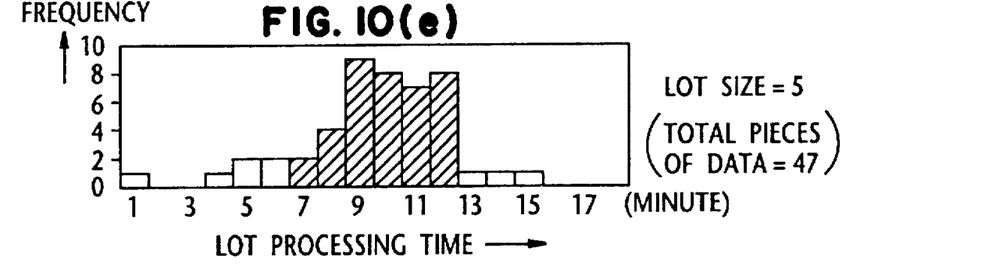
Figure 11A:
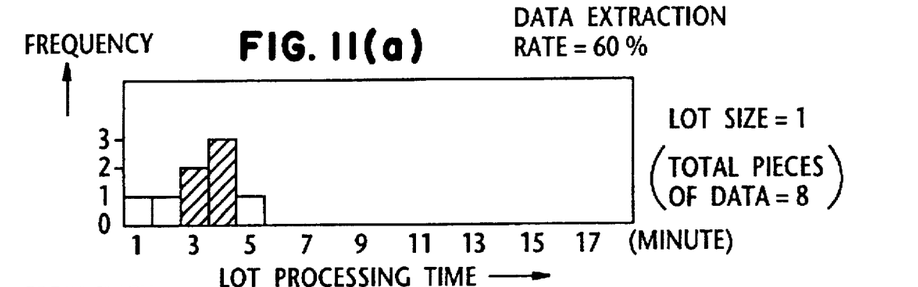
Figure 11B:
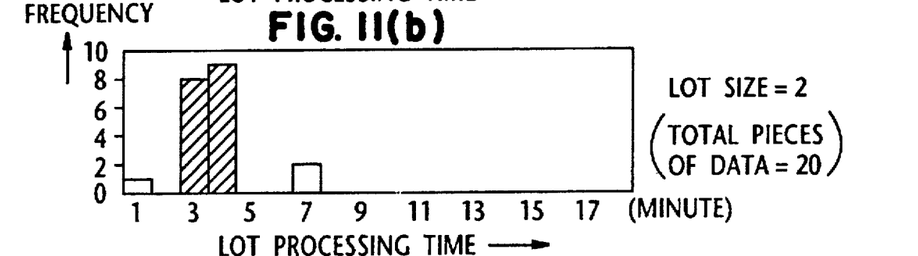
Figure 11C:
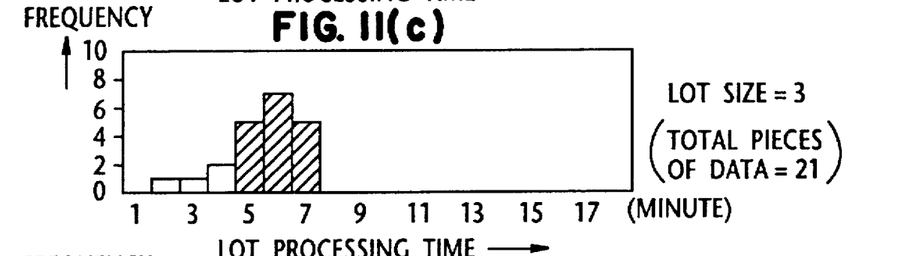
Figure 11D:
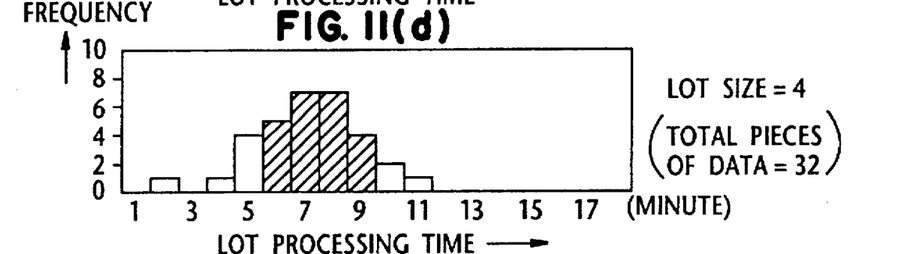
Figure 11E:
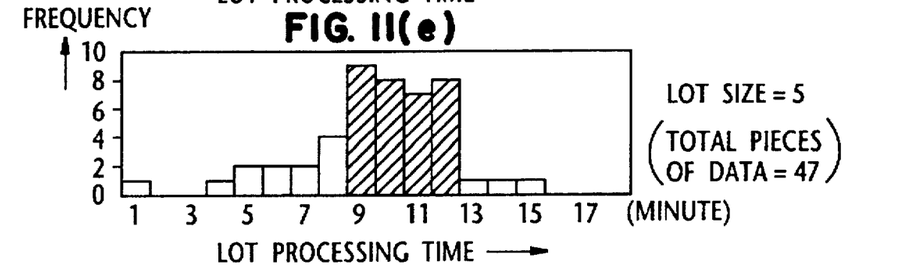
Figure 12A:
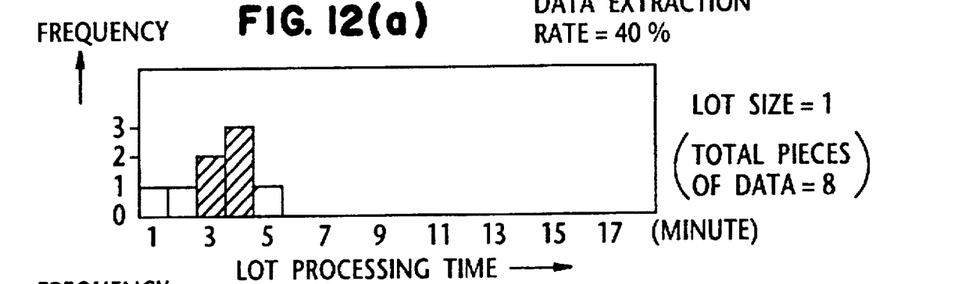
Figure 12B:
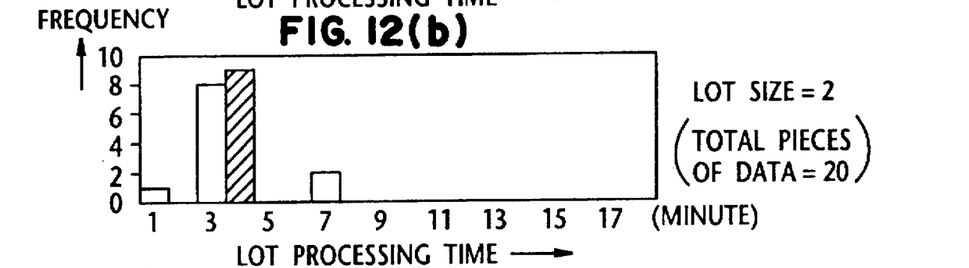
Figure 12C:
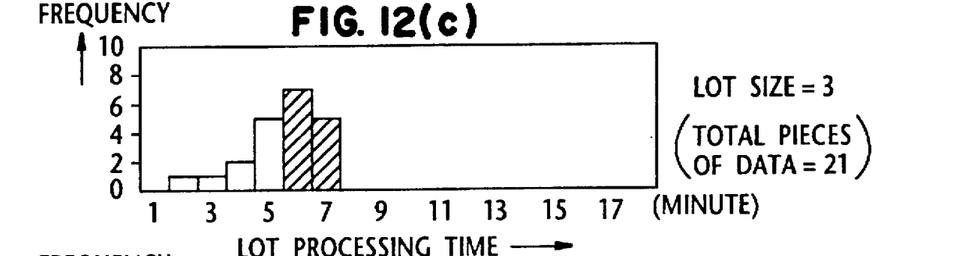
Figure 12D:
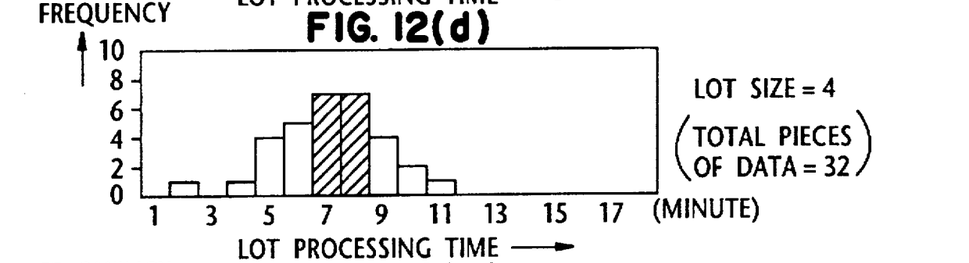
Figure 12E:
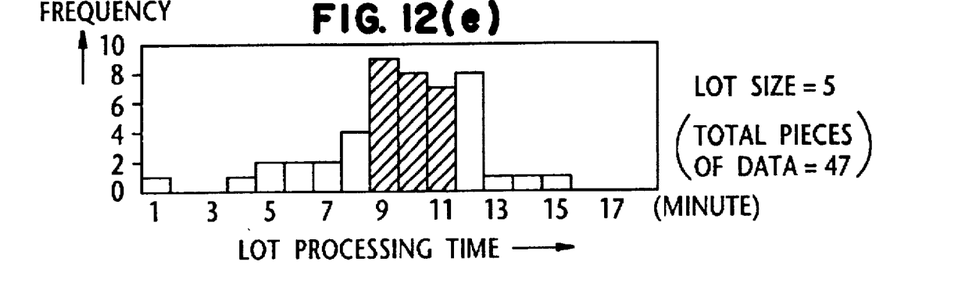
Figure 13A:
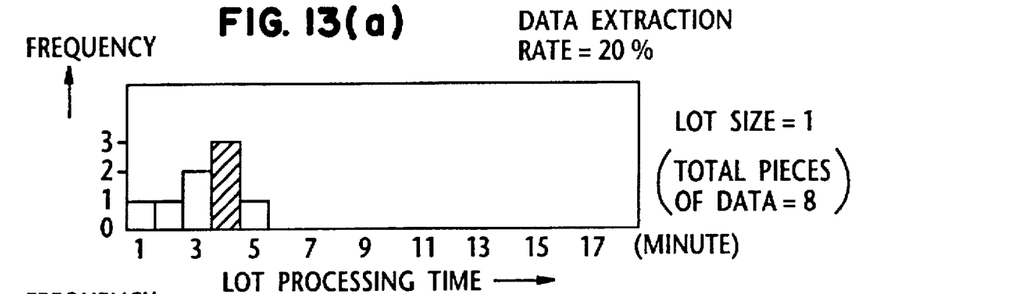
Figure 13B:
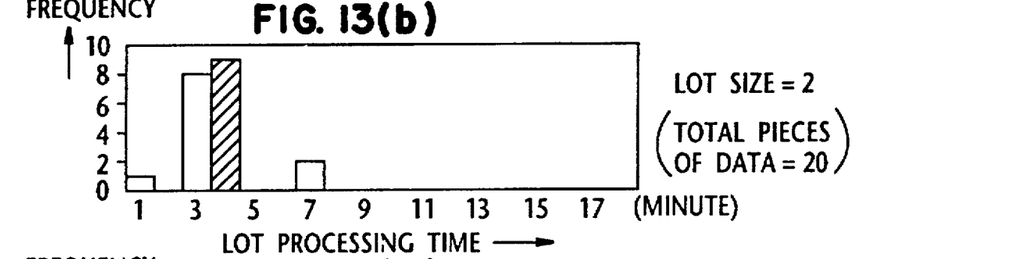
Figure 13C:
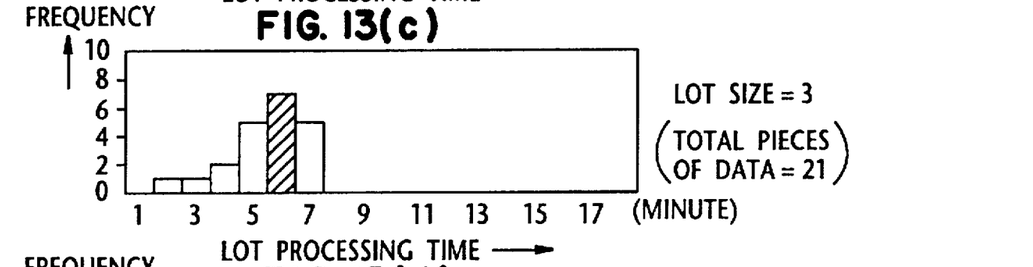
Figure 13D:
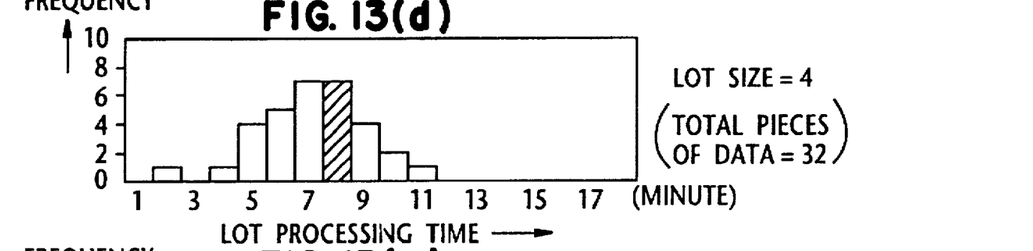
Figure 13E:
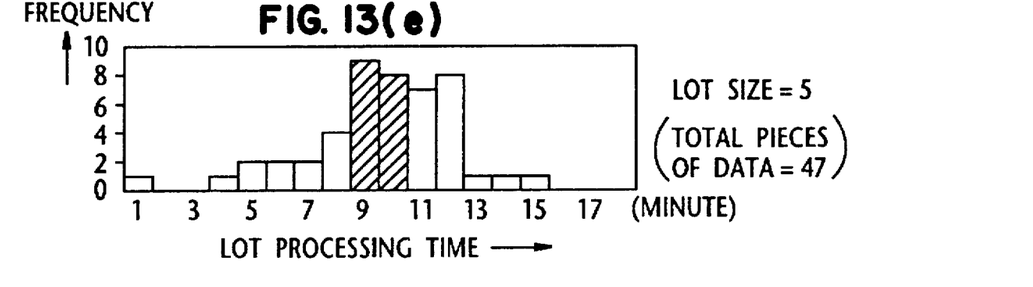

Firstly, all the data are extracted or retrieved from the suitable memory (viz., 100% data extraction) and thus, all the bars indicating the frequencies are hatched in FIGS. 9(a–e). The average lot processing time is calculated as follows. Each frequency extracted is multiplied by the corresponding lot processing time. Then, the products thus obtained are added up and then divided by the total number of frequencies extracted. As an example, in the case of for 100% data extraction (the lot size 1):

$$[(1\times1)+(1\times2)+(2\times3)+(3\times4)+(1\times5)]/8=3.25$$

Figure 14:
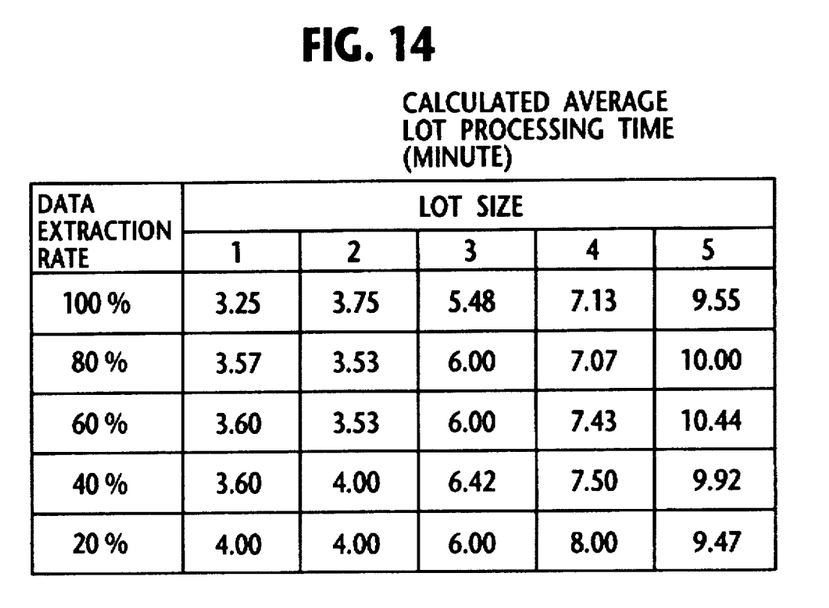
FIG. 14 is a table showing average lot processing times.

The average lot processing times which are calculated with respect to the 100% data extraction rate (the lot sizes 1–5), are listed in FIG. 14.

Figure 8A:
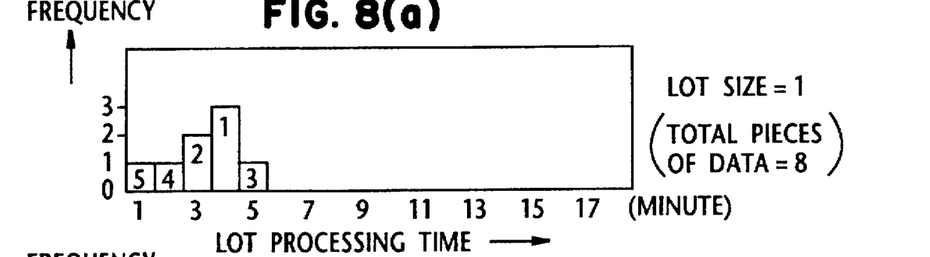
Figure 8B:
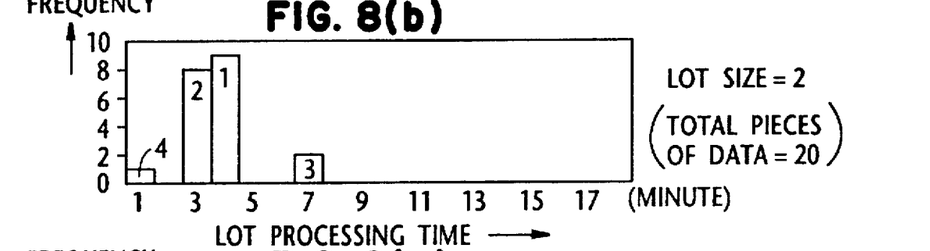
Figure 8C:
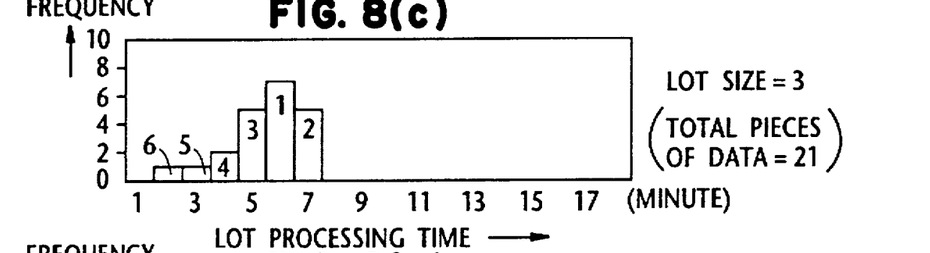
Figure 8D:
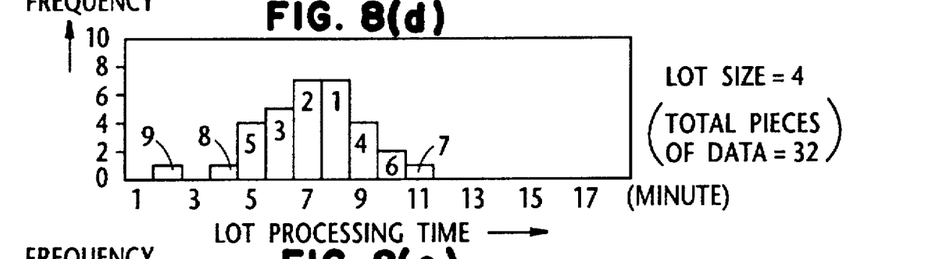
Figure 8E:
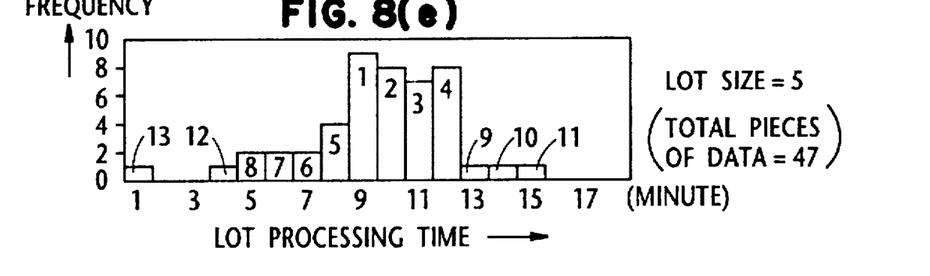

FIGS. 10(a–e) show the case where the data extraction rate is 80%. In the case where the lot size is one (1), the total number of pieces of data (viz., 8) is multiplied by the coefficient 0.8 (80%) and thus, we obtain the product of 6.4. This product is compared with the first frequency (viz., the maximum frequency (3)) ranked top for adding (FIGS. 7 and 8(a–e)). Since the product is larger than the first frequency, the product is further compared with the numerical value obtained by adding the second ordered frequency (viz., 2) to the first one. The above mentioned product (viz., 6.4) is still larger than the sum (3+2=5). Thus, the product is still further compared with the next sum (3+2+1=6). As in the above cases, the product (viz., 6.4) is still larger than the sum (viz., 6) and thus the further addition is implemented, obtaining a new sum (3+2+1+1=7). In this case, since the product falls below the sum, the number of pieces of data is determined as seven (7) which equals the just mentioned sum. Summing up, the above mentioned product is successively compared with the sums until the product becomes less than the last sum.

The above discussion is also applied to the cases of lot sizes 2–5 (FIG. 10(b–e)) and further is applied to the cases of data extraction rates 60%, 40%, and 20% (FIGS. 11(a–e) to 13(a–e)) as well.

The average lot processing times thus calculated are listed in FIG. 14.

Figure 15A:
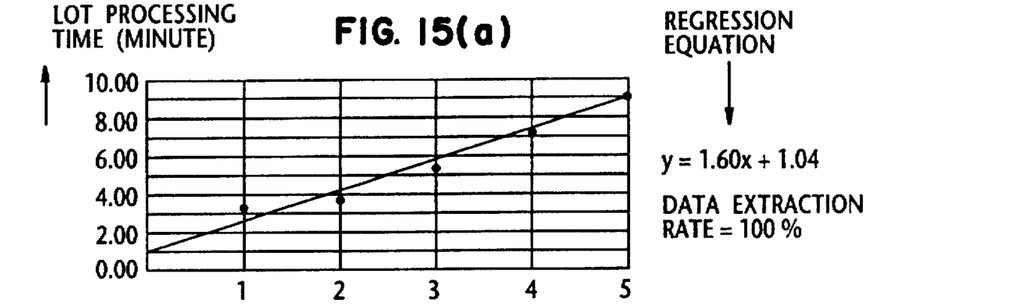
Figure 15B:
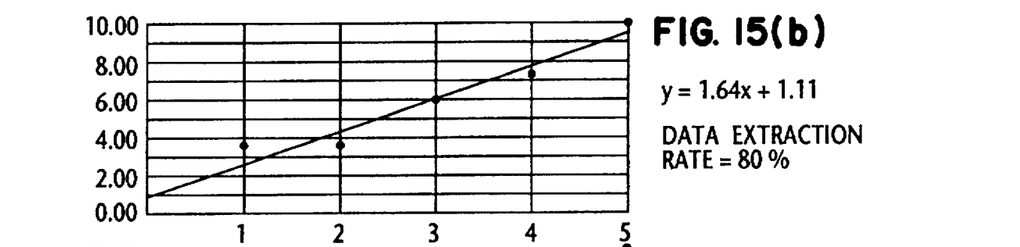
Figure 15C:
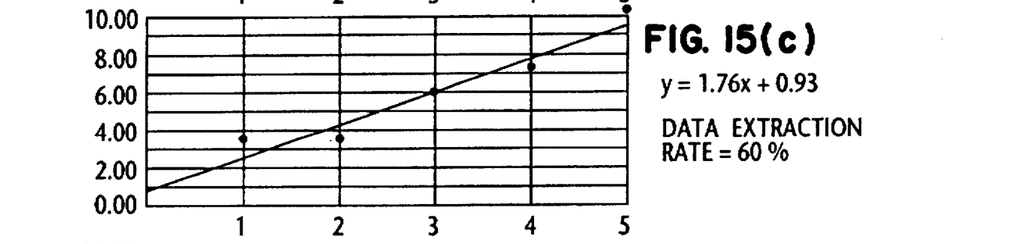
Figure 15D:
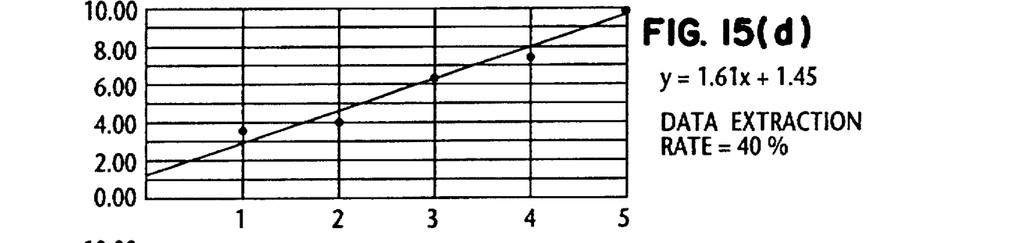
Figure 15E:
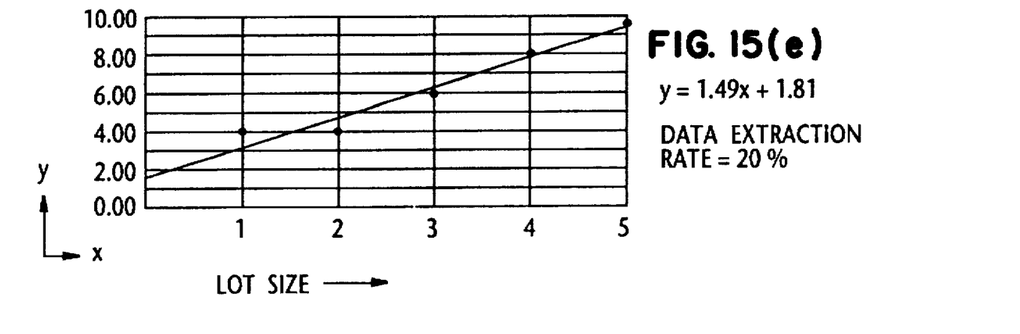

Following this, at step 16, five regression lines are determined in the instant case for the respective average lot processing times in terms of lot sizes 1–5 as shown in FIG. 14. The five regression lines thus obtained are shown in FIGS. 15(a–e). In FIGS. 15(a–e), the average lot processing times are plotted (black dots) in the corresponding graphs. The determination of the regression lines is well known in the art and accordingly, the description thereof is deemed redundant ant thus omitted for simplifying the disclosure.

Figure 16:
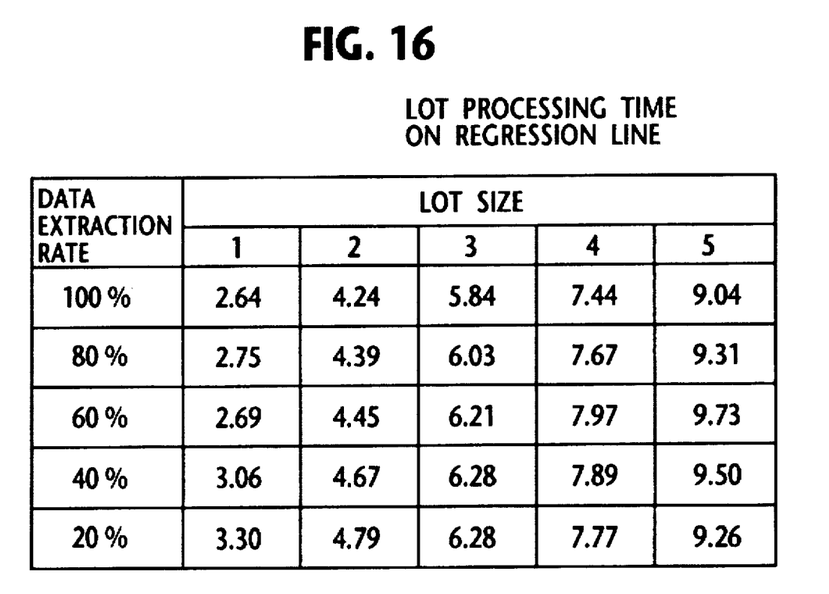
FIG. 16 is a table listing a plurality of lot processing times located on the regression lines shown in FIGS. 15(a–e)
Figure 17:
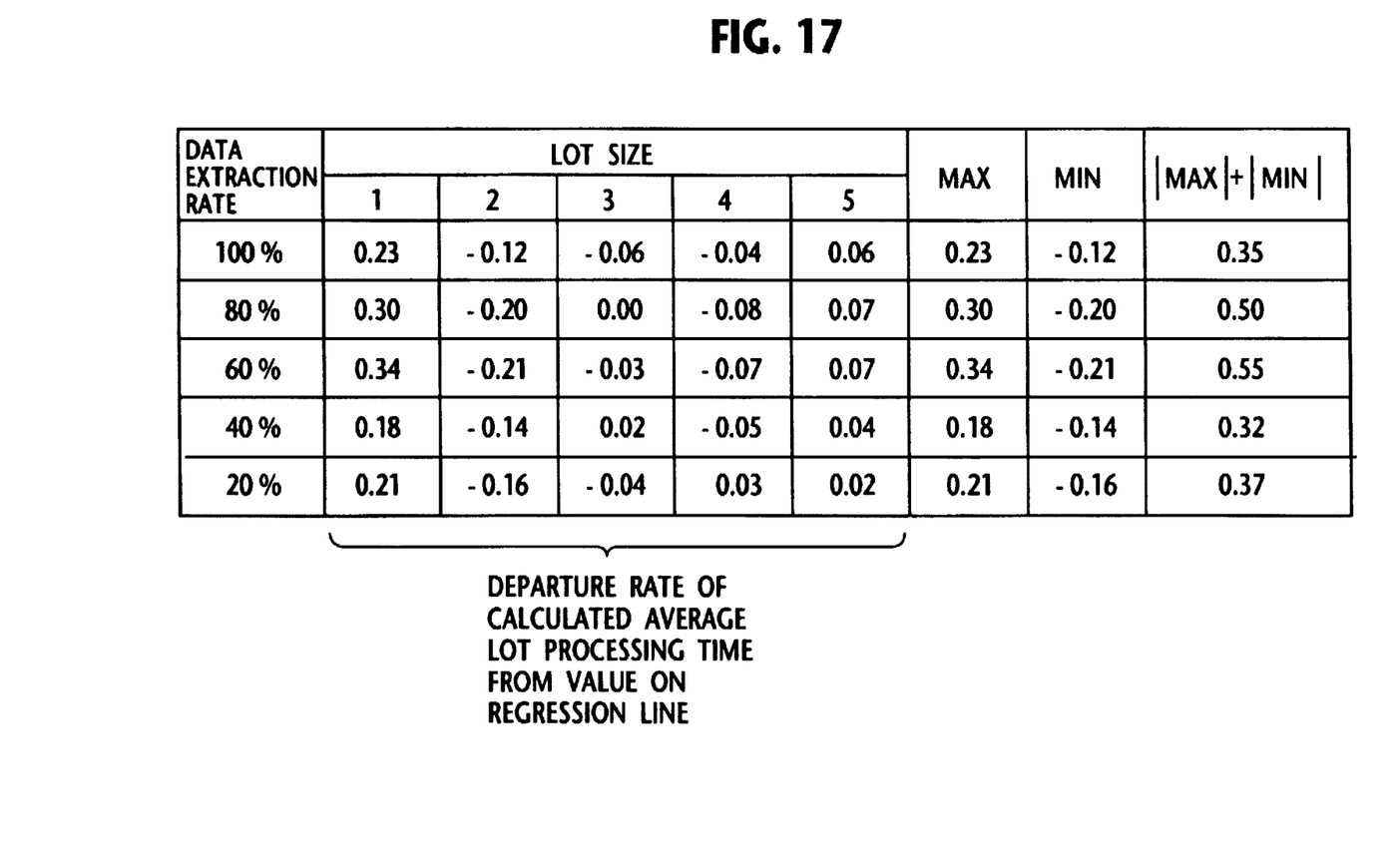
FIG. 17 is a table for use in finally determining a regression equation (equation of regression line).

Subsequently, at step 18, the lot processing times located on the respective regression lines are determined as shown in FIG. 16. Thereafter, as illustrated in FIG. 17, departure rates are determined each of which indicates a deviation of the calculated average lot processing time from the corresponding processing time on the regression line.

The departure rate is obtained by dividing the average processing time (FIG. 14) by the corresponding processing time on the regression line (FIG. 16) and then, the resultant quotient is subtracted by one (1). Following this, the maximum and minimum among the departure rates belonging to each of the five data extraction rates are determined (FIG. 17). Further, the absolute values of the maximum and minimum are added and thereafter, the smallest sum is determined. In this instance, 0.32 of the data extraction rate 40% is the smallest. Therefore, the regression equation of the data extraction rate 40% (see FIGS. 15(a–e)) is selected as the regression equation which shall be utilized to model the apparatus An.

In the above discussion, the data extraction rates have been set to 100%, 80%, 60%, 40%, and 20%. However, it goes without saying that the number of extraction rates can arbitrarily be determined.

It will be understood that the above disclosure is representative of only one possible embodiment of the present invention and that the concept on which the invention is based is not specifically limited thereto.

What is claimed is:

1. A method of modeling a production apparatus using a regression equation, said production apparatus arranged to process a plurality of items in lots of different sizes, and said regression equation estimating a lot processing time of each of said lots, said method comprising the steps of:

(a) measuring a plurality of lot processing times of said production apparatus for a plurality of said lots;

(b) inputting data to a computer, said data representing said plurality of lot processing times;

(c) determining, using said data, a frequency distribution for said lot processing times in connection with each of said lots;

(d) extracting a plurality of sets of lot processing times from each of the frequency distributions by varying a data extracting rate;

(e) calculating an average processing time of each of said plurality of sets of lot processing times;

(f) determining a plurality of regression lines for the average lot processing times in connection with the respective lots;

(g) determining a degree of departure of each of the average lot processing times from a corresponding value on each of said regression lines;

(h) selecting one of said regression lines using said degree of departure, said selected one of said regression lines being determined as corresponding to said regression equation.

2. A method as claimed in claim 1, wherein said production apparatus is an apparatus used in a sequence of integrated circuit fabrication.

3. A method as claimed in claim 1, wherein step (d) includes:

determining an order of extracting said plurality of sets of lot processing times from each of the frequency distributions; and varying the data extracting rate by a predetermined value.

4. A method as claimed in claim 3, wherein said production apparatus is an apparatus included in a sequence of integrated circuit fabrication.

5. A method as claimed in claim 1, wherein said one of said regression lines, selected in step (h), exhibits a smallest degree of departure among the degrees of departure determined in step (g).

6. A method as claimed in claim 1, further comprising the step of:

(i) modeling said production apparatus using said regression equation.

7. A method of processing a plurality of items in a production apparatus using a regression equation, said production apparatus arranged to process said plurality of items in lots of different sizes, said regression equation estimating a lot processing time of each of said lots, said method comprising the steps of:

(a) inputting data to a computer, said data representing a plurality of lot processing times for each of said lots, said data having been collected from said apparatus before being input to said computer;

(b) determining, using said data, a frequency distribution for said lot processing times in connection with each of said lots;

(c) extracting a plurality of sets of lot processing times from each of the frequency distributions by varying a data extracting rate;

(d) calculating an average processing time for each of said plurality of sets of lot processing times;

(e) determining a plurality of regression lines for said average processing times in connection with the respective lots;

(f) determining a degree of departure of each of said average processing times from a corresponding value on each of said regression lines;

(g) selecting one of said regression lines using said degree of departure; said selected one of said regression lines being determined as corresponding to said regression equation; and, (h) modeling said apparatus and processing said plurality of items in accordance with said selected one of said regression lines.

8. A method as claimed in claim 7, wherein said production apparatus is an apparatus used in a sequence of integrated circuit fabrication.

9. A method as claimed in claim 7, wherein step (c) includes:

determining an order of extracting said plurality of sets of lot processing times from each of the frequency distributions; and varying the data extracting rate by a predetermined value.

10. A method as claimed in claim 9, wherein said production apparatus is an apparatus included in a sequence of integrated circuit fabrication.

11. A method as claimed in claim 7, wherein said one of said regression lines, selected in step (g), exhibits a smallest degree of departure among the degrees of departure determined in step (f).

* * * * *